United States Patent
Barglik-Chory et al.

[11] Patent Number: 6,140,419
[45] Date of Patent: Oct. 31, 2000

[54] POWDER COATING COMPOSITION INCLUDING AN EPOXY-FUNCTIONALIZED SILANE RESIN

[75] Inventors: Christine Barglik-Chory, Fuchsstadt; Karl-Heinz Haas, Veitschochheim, both of Germany

[73] Assignee: Fraunhofer-Gesellschaft zur Forderung der Angewandten Forschung E.V., Munich, Germany

[21] Appl. No.: 09/232,797

[22] Filed: Jan. 15, 1999

[30] Foreign Application Priority Data

Jan. 15, 1998 [DE] Germany ............ 198 01 266

[51] Int. Cl.⁷ ............... C08F 8/00; C09D 5/03
[52] U.S. Cl. ........... 525/100; 525/438; 525/446; 525/474; 525/476; 525/934; 528/27
[58] Field of Search .................. 525/100, 438, 525/446, 476, 474, 934; 528/27

[56] References Cited

U.S. PATENT DOCUMENTS

| 4,954,580 | 9/1990 | Zahir ............ 525/474 |
| 5,280,098 | 1/1994 | Witucki et al. ............ 528/17 |
| 5,464,901 | 11/1995 | Yoshikawa et al. ............ 525/103 |
| 5,516,858 | 5/1996 | Morita et al. ............ 525/478 |
| 5,756,777 | 5/1998 | Shinohara et al. ............ 549/523 |

FOREIGN PATENT DOCUMENTS

| 0 735 118 A1 | 10/1996 | European Pat. Off. . |
| 735 118 | 10/1996 | European Pat. Off. . |
| 0 731 815 B1 | 1/1998 | Germany . |

*Primary Examiner*—Margaret G. Moore
*Attorney, Agent, or Firm*—Barnes & Thornburg

[57] ABSTRACT

The invention pertains to a powder lacquer composition containing epoxy-reactive polymers as binders and epoxy-functional siloxane resins as hardeners as well as additives, if required, such as pigments and/or fillers and/or thermal stabilizers and/or additives such as flow-promoting agents and de-gassing agents, whereby the hardener is a compound which is prepared by the hydrolysis and condensation of an organo-silane $R_2SiX_2$ of an epoxy-functionalized silane.

20 Claims, No Drawings

POWDER COATING COMPOSITION INCLUDING AN EPOXY-FUNCTIONALIZED SILANE RESIN

The invention pertains to a special powder lacquer composition which contains an epoxy-functionalized siloxane resin as the hardener.

Powder lacquers essentially consist of particles which are solid at room temperature or, as the case may be, the application temperature and which melt and flow at higher temperatures. As a result of this, a lacquer layer is formed which hardens to completion via cross-linking reactions during the baking process. The process of powder lacquer coating comprises the extrusion of the components together with the addition of additives and ancillary agents such as flow-promoting agents, pigments, fillers, etc.; grinding in the cold state to give defined particle sizes; the application of the powder to heat-resistant substrates, e.g. by means of electrostatic powder spraying; and the melting and hardening to completion of the powder by heating to 120 to 210° C.

Thermally curable powder lacquers have been known for approximately 20 years which contain organo-polysiloxanes in addition to purely organic components.

A powder lacquer composition is known from EP 0 735 118 A1 which consists of an epoxy-functionalized branched organo-polysiloxane as the hardener, whereby compounds are proposed as binders which carry functional groups which are capable of reacting with epoxy groups.

The preparation of this hardener, which is designated A in EP 0 735 118 A1, takes place via an equilibrium reaction between epoxy-functionalized alkoxysilanes and branched organo-polysiloxanes. The branched organo-polysiloxanes are hereby obtained in all cases by the hydrolysis and condensation of organo-chlorosilanes.

It has now been found that the use of such a hardener, which has been prepared from organo-chlorosilanes, has a disadvantageous effect in the powder lacquer especially in regard to protection against corrosion. The use of such a hardener is found to be disadvantageous when good protection against corrosion via the powder is to be achieved on metal surfaces without any pretreatment.

Proceeding from here, the problem for the present invention is therefore to propose a powder lacquer composition with which it becomes possible to achieve a coating which permits adequate corrosion protection without any chemical pretreatment.

This problem is solved by the characterizing features of claim 1. The subsidiary claims show advantageous further forms of embodiments.

In accordance with the invention, it is therefore proposed that use be made of a special hardener for the powder lacquer composition. An essential feature in regard to the subject of the [patent] application is that a hardener is used which is not prepared from chlorosilanes but, rather, via the hydrolysis and condensation of specially selected organo-silanes and epoxy-functionalized silanes of general formulas I, II and III.

In order to prepare the hardener, use is made in this connection of 70–95 mol-% of an organo-silane of general formula I $$R_2SiX_2 \qquad\qquad I$$

in which R is an unsubstituted or substituted aryl group and X=OH or OR' with R'=C1–C4 alkyl. The phenyl group, which is especially preferred, can also contain functional groups such as amino groups or mercapto groups. Arylalkyl groups can also be used either together with phenylene or on their own.

The compounds, that have been defined above, of general formula I are reacted with 5–30 mol-% of an epoxy-functionalized silane of general formula II $$R''SiX_3 \qquad\qquad II$$

and/or with an epoxy-functionalized silane of general formula III $$R''R'''SiX_2 \qquad\qquad III$$

In the compounds of general formula II and III, R" is an epoxy-functional organic group. R'" is again a C1–C4 alkyl. X hereby has the meaning which is indicated in general formula I.

Glycidyloxypropyl and (3,4-epoxycyclohexyl)ethyl are especially preferred for the residues R".

3-glycidyloxypropyltrimethoxysilane is especially preferred for the compounds of general formula II.

An essential aspect during the preparation of the hardener in this connection is that the indicated molar ratios of 70–95 mol-% for the general formula I and 5–30 mol-% for the general formula II and/or III be accurately maintained. The reaction can be carried out at 0–80° C. The reaction preferably takes place at 20–60° C.

The hardeners that have been prepared in this way can then be used in combination with polymers, as binders, which contain carboxyl groups, anhydride groups or amino groups and which are known as such from the prior art. Special examples of the binders are carboxy-functionalized organic polymers such as e.g. the polyester resins Uralac P4800® with an acid number of 24–28 or Uralac P2200® with an acid number of 48–55 and the acrylic resins SCX-819® with an average acid number of 75 or SCX-839® with an average acid number of 105.

In this connection, the procedure which is followed with the powder lacquer composition is that 20–400 parts by weight of the hardener are added per 100 parts by weight of the binder. The powder lacquer can also contain additional additives, which are known as such from the prior art, such as pigments and/or fillers and/or thermal stabilizers and/or further additives such as e.g. flow-promoting agents and de-gassing agents.

If required, the powder lacquer can also contain Si-oxide particles, Al-oxide particles, Ti-oxide particles or Cr-oxide particles which can also be organically functionalized, if required, and which have particle sizes of 5–500 nm. These oxide particles increase the mechanical strength of the layer without impairing its transparency. In addition, epoxy-functionalized organic resins can be added, whereby more than 10 parts by weight of silicone resin are used per 100 parts by weight of organic epoxy resin.

The powder lacquers, that have been described, can be applied to the substrate not only in the form of solids but also in the form of solutions or suspensions. Protic and aprotic, polar and non-polar, solvents or suspension media are suitable and also their mixtures, especially mixtures with water.

In addition, stabilizers can be added such as e.g. the salts of carboxylic acids or amino-carboxylic acids with chain lengths of C2 to C18 in each case.

The invention is elucidated in more detail below on the basis of an example of an embodiment and corrosion studies.

EXAMPLE 1

3.00 mol (732.96 g) diphenyldimethoxysilane, 0.60 mol (141.80 g) 3-glycidyloxypropyltrimethoxysilane, 3.90 mol (70.20 g) water and 0.18 mol (14.78 g) 1-methylimidazole are weighed out together and stirred for 7 hours at 40° C. After a further 14 hours of stirring at room temperature, the liquid phase is subjected to rotary evaporation at 30 mbar/30° C. and the precipitate, that is produced, is dissolved in the form of a colloidal solution in 4000 g methylene chloride and then spray dried.

EXAMPLE 2

0.30 mol (73.30 g) diphenyldimethyloxysilane, 0.06 mol (14.18 g) 3-glycidyloxypropyltrimethoxysilane, 0.39 mol (7.02 g) water and 0.018 mol (1.48 g) 1-methylimidazole are weighed out together and stirred for 7 hours at 40° C. The liquid phase is then subjected to rotary evaporation at 30 mbar/30° C. and the precipitate, that is produced, is dried at 70° C. in a cabinet with circulating air until constancy of weight is achieved. The solid is suspended in 6 times its weight of a water/ethyl acetate mixture in a 1:1 ratio by weight together with an addition of 5% by weight (based on the solid) of aminobutyric acid as a stabilizer. This suspension is combined with a suspension of the acrylic resin SCX-839 (100 parts by weight SCX-839 per 100 parts by weight of the siloxane solid) together with an addition of 1.50 g BYK 361 and 0.50 g benzoin and applied using a wet spray pistol.

Surprisingly, the powder lacquers excel by virtue of very good corrosion resistance of the layers without any chemical pretreatment of the steel test sheets such as e.g. a chromate treatment. The ORMOCER component, which was obtained in accordance with Usage Example 1, was extruded with 596 g Uralac P 4800 (carboxy functional polyester with an average acid number of 26) and, as flow promoting agents, 14.7 g BYK 361 and 4.9 g of benzoin and ground and electrostatically applied to metal test sheets and then hardened for 15 minutes at the temperatures that are indicated below. The metal test sheets were merely cleaned beforehand with ethyl acetate and ethanol. The layer thickness amounted to between 30 and 40 mm. Lattice sections were prepared and then a steamy water test was carried out in accordance with DIN 50017. The commercially obtainable powder lacquer VEDOC PE was used as a reference.

| Preparation | Temperature for hardening to completion [° C.] | Infiltration [Gt] |
|---|---|---|
| ORMOCER-FL | 180 | 2 |
|  | 190 | 0 |
|  | 200 | 0 |
|  | 210 | 1 |
| VEDOC OE | 180 | 4 |
|  | 190 | 5 |

-continued

| Preparation | Temperature for hardening to completion [° C.] | Infiltration [Gt] |
|---|---|---|
|  | 200 | 3 |
|  | 210 | 2 |

The surfaces, that had been rusted as a result of infiltration, were evaluated analogously to the lattices section evaluation in accordance with DIN 53151. In contrast to VEDOC PE, the ORMOCER powder lacquer does not exhibit any infiltration at temperatures for hardening to completion of 190 and 200° C.

What is claimed is:

1. Powder lacquer composition containing epoxy-reactive polymers as binders and epoxy-functional siloxane resins as hardeners as well as additives wherein the hardener is a compound which is prepared by the hydrolysis and condensation at 0–80° C. of an organo-silane of general formula I $$R_2SiX_2$$

in which R is a substituted or unsubstituted aryl group, and X=OH or OR' with R'=$C_1$–$C_4$ alkyl, and an epoxy-functionalized silane of general formula II $$R''SiX_3$$

in which R'' is an epoxy-functional organic group and X has the meaning given by formula I and an epoxy-functional silane of general formula III $$R''R'''SiX_2$$

in which R'' and X have the meaning given by formula II and R''' is a $C_1$–$C_4$ alkyl and wherein the hardener comprises 70–95 mol-% of the organo-silane of general formula I and 5–30 mol-% of the epoxy-functional silanes of general formulas II and III.

2. Powder lacquer in accordance with claim 1 wherein in general formula I, R=phenyl and/or arylalkyl.

3. Powder lacquer in accordance with claim 2 wherein R'' in general formula II or III is glycidoxypropyl or (3,4-epoxycyclohexyl)ethyl.

4. Powder lacquer in accordance with claim 3 wherein use is made of 20 to 400 parts by weight of the hardener per 100 parts by weight of the binder.

5. Powder lacquer in accordance with claim 3 wherein the compound of general formula II is 3-glycidyloxypropyltrimethoxysilane.

6. Powder lacquer in accordance with claim 5 wherein use is made of 20 to 400 parts by weight of the hardener per 100 parts by weight of the binder.

7. Powder lacquer in accordance with claim 2 wherein use is made of 20 to 400 parts by weight of the hardener per 100 parts by weight of the binder.

8. Powder lacquer in accordance with claim 2 wherein the binder is selected from any desired epoxy-reactive components.

9. Powder lacquer in accordance with claim 2 wherein that the compound of general formula I is diphenyldimethoxysilane.

10. Powder lacquer in accordance with claim 9 wherein R'' in general formula II or III is glycidoxypropyl or (3,4-epoxycyclohexyl)ethyl.

11. Powder lacquer in accordance with claim 10 wherein use is made of 20 to 400 parts by weight of the hardener per 100 parts by weight of the binder.

12. Powder lacquer in accordance with claim 10 wherein the compound of general formula II is 3-glycidyloxypropyltrimethoxysilane.

13. Powder lacquer in accordance with claim 12 wherein use is made of 20 to 400 parts by weight of the hardener per 100 parts by weight of the binder.

14. Powder lacquer in accordance with claim 9 wherein use is made of 20 to 400 parts by weight of the hardener per 100 parts by weight of the binder.

15. Powder lacquer in accordance with claim 1 wherein R" in general formula II or III is glycidoxypropyl or (3,4-epoxycyclohexyl)ethyl.

16. Powder lacquer in accordance with claim 15 wherein use is made of 20 to 400 parts by weight of the hardener per 100 parts by weight of the binder.

17. Powder lacquer in accordance with claim 15 wherein the compound of general formula II is 3-glycidyloxypropyltrimethoxysilane.

18. Powder lacquer in accordance with claim 17 wherein use is made of 20 to 400 parts by weight of the hardener per 100 parts by weight of the binder.

19. Powder lacquer in accordance with claim 1 wherein use is made of 20 to 400 parts by weight of the hardener per 100 parts by weight of the binder.

20. Powder lacquer in accordance with claim 1 wherein the binder is selected from any desired epoxy-reactive components.

* * * * *